United States Patent Office 3,058,884
Patented Oct. 16, 1962

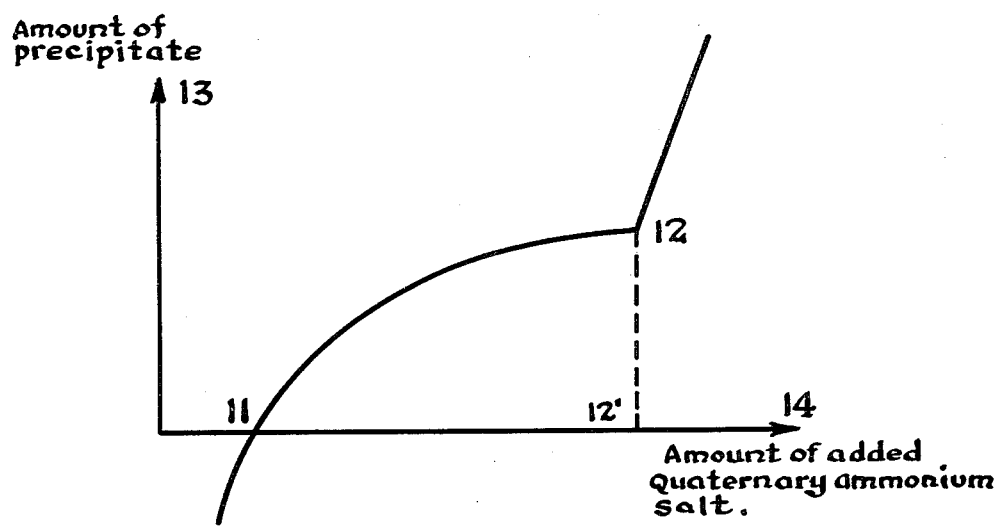

3,058,884
PROCESS FOR PURIFYING HEPARIN
Milton M. Mozen, Highland Park, and Thomas D. Evans, Libertyville, Ill., assignors to Abbott Laboratories, Chicago, Ill., a corporation of Illinois
Filed Sept. 14, 1959, Ser. No. 839,610
10 Claims. (Cl. 167—74)

The present invention relates to the manufacture of heparin. More particularly, it relates to a novel process of isolating heparin from an animal tissue source.

The recovery of heparin from animal tissue is a lengthy and expensive process employing many hours of time and numerous materials. In most instances, the methods of recovery require an autolysis and a digestion step to separate heparin from a protein-heparin complex obtained from animal tissues. Complete autolysis takes approximately 24 hours while a digestion step requires from 48 to 72 hours. Other cumbersome purification procedures are required to obtain a high potency heparin. The combination of time and materials consumed make the recovery of heparin by these methods expensive, and consequently the cost of heparin is high.

The preparation of a heparin containing extracts has been described in various articles such as by Howell (American Journal of Physiology, 63, 434; 1922), by Charles and Scott (Journal of Biological Chemistry 102, 25; 1933), Kuizenga and Spaulding (Journal of Biological Chemistry, 148, 641; 1941) and others. Isolating the heparin from the heparin containing extract, is an even more involving and complicated operation than the preparation of the extract and necessitates considerable amounts of time and equipment.

Some of the more recent references mention the fact that heparin may be precipitated from an aqueous solution with relatively large quantities of quaternary ammonium salts. These salts form with the heparin a water-insoluble complex from which heparin can easily be freed. Unfortunately, however, such a method is of little use in separating heparin from an animal tissue extract that contains other animal materials such as proteins, nucleic acids, polysaccharides, salts, etc., since some of these materials also form insoluble complexes with the quaternary ammonium salt.

It is an object of the present invention to provide a process for selectively precipitating a water-insoluble heparin complex directly from a heparin containing extract and, thus, eliminating prior protein digestion. It is also an object of this invention to provide a simplified process for recovering a water-insoluble heparin complex from an animal tissue extract containing heparin and other water-soluble animal tissue components. It is a further object of this invention to provide a process which produces high potency heparin in high yields within a few hours. A still further object is the formation of a water-insoluble complex from which heparin can easily be isolated.

These and other objects can be accomplished by treating an aqueous animal tissue extract containing heparin with a specific amount of a water-soluble quaternary ammonium salt as hereinafter defined. The quaternary ammonium salt forms with the heparin in the aqueous extract from animal tissue an insoluble complex which can easily be isolated when the proper amount of quaternary ammonium salt is employed. The water-insoluble complex thus formed can easily be broken into its components, and free heparin isolated with high yields and excellent potency.

The water-soluble quaternary ammonium salts useful for precipitating a water-insoluble complex with heparin may be chosen from a group of materials characterized by the formula:

wherein X may be any anion that does not render the salt water-insoluble, e.g., chloride, bromide, sulfate, etc.; and wherein R is an aliphatic hydrocarbon chain of at least 8 carbon atoms which may be part of a hererocyclic system together with other R' radicals, said hydrocarbon chains optionally being interrupted by oxygen, double bonds, nitrogen, and aromatic rings; and wherein the R' radicals are taken from the group consisting of lower alkyls of 1–7 carbon atoms, aralkyl, alkenyl, alkoxy, polyalkoxy, and chloroalkyl. The term "water-soluble" as used in the present specification and claims is intended to specify a solubility of the ammonium salt of at least 2% (weight per volume) in water at 40° C. This requirement automatically sets the upper limit for the carbon chain length, since by lengthening the alkyl radicals on the quaternized nitrogen atom the quaternary ammonium salts become less water-soluble.

In order to better illustrate the varieties of quaternary ammonium salts useful in the process of the present invention, reference is made to the appended table. This table lists, in separate columns, the various radicals of the quaternized nitrogen atom; where a divalent or trivalent radical is listed, this radical is occupying two or three valencies of the nitrogen atoms and thus signifies a heterocyclic ring. It is to be understood that this table exemplifies some of the quaternary ammonium compounds falling within the scope of the above definition and that other similar compounds will be equally suitable.

The "mol. wt." column of Table 1 refers to the molecular weights of the cations of the particular quaternary ammonium salt. It will be readily seen that these cation molecular weights are all in the range of 172 to about 450.

TABLE 1
Quaternary Ammonium Salts

| R | R'(1) | R'(2) | R'(3) | Mol. wt. |
|---|---|---|---|---|
| —C₈H₁₇ | —CH₃ | —CH₃ | —CH₃ | 172 |
| —C₁₂H₂₅ | —CH₃ | —CH₃ | —CH₃ | 228 |
| —C₁₆H₃₃ | —CH₃ | —CH₃ | —CH₃ | 284 |
| —C₁₈H₃₇ | —CH₃ | —CH₃ | —CH₃ | 312 |
| —C₁₈H₃₅ | —CH₃ | —(CH₂)₂OH | —(CH₂)₂OH | 370 |
| —C₂₂H₄₅ | —CH₃ | —CH₃ | —CH₃ | 368 |
| —C₂₄H₄₉ | —CH₃ | —CH₃ | —CH₃ | 396 |
| —C(C₁₇H₃₃)=N—CH₂—CH₂— | | —(CH₂)₂OH | —(CH₂)₄Cl | 441.5 |
| —C₁₂H₂₅ | ⌬—CH₂— | —CH₃ | —CH₃ | 304 |
| —C₁₆H₃₃ | ⌬—CH₂— | —CH₃ | —CH₃ | 360 |

TABLE I—Continued

| R | R'(1) | R'(2) | R'(3) | Mol. wt. |
|---|---|---|---|---|
| (CH₃)₃C-CH₂-C(CH₃)₂-C₆H₄-(OC₂H₄)₂- | C₆H₅-CH₂- | -CH₃ | -CH₃ | 412 |
| (CH₃)₃C-CH₂-C(CH₃)₂-C₆H₄-(OC₂H₄)₂- | Cl-C₆H₄-CH₂- | -CH₃ | -CH₃ | 446.5 |
| C₉H₁₉-C₆H₃(CH₃)-CH₂- | -CH₃ | -CH₃ | -CH₃ | 290 |
| C₁₅H₃₁-C₆H₃(CH₃)-CH₂- | -CH₃ | -CH₃ | -CH₃ | 374 |
| =CH-CH=CH-CH=CH- | | | -C₁₆H₃₃ | 304 |
| -C₁₆H₃₁ | -CH₃ | -CH₃ | -CH₃ | 282 |
| -C₁₄H₂₉ | C₆H₅-CH₂- | -CH₃ | -CH₃ | 332 |
| C₆H₁₃-(thiophene)- | -CH₃ | -CH₃ | -CH₃ | 226 |

The essential feature of the present invention is the selective precipitation of the heparin as a water-insoluble complex. Due to the variety of quaternary ammonium salts that will precipitate the heparin, and due to the various types and amounts of other compounds that may be present in the animal extract containing the heparin, a universal range of the amount of the quaternary ammonium salt to be added cannot be given. However, once a given animal tissue extract is assayed and the quaternary ammonium salt to be used is chosen, the amount of this quaternary ammonium salt to precipitate the heparin without precipitating other materials in the extract can easily be determined. These results are fully reproducible.

The minimum amount of the quaternary ammonium salt that is necessary to precipitate the heparin in the animal extract can easily be determined by titration, i.e., a solution of the quaternary ammonium salt is added slowly to the animal tissue extract containing the heparin until a precipitate appears.

To determine the maximum amount of quaternary ammonium salt permissible to produce high potency heparin, the above titration is continued and the precipitate is removed after further additions of quaternary ammonium salt solution. It will be seen that shortly after the first precipitate is obtained and the titration is continued, with further addition of the ammonium salt the amount of precipitate remains substantially constant. However, as titration is continued, a point is reached at which an increase of precipitation will again be observed. This marked increase in precipitate is the end point of the titration, the excess precipitate being a complex of ammonium salt with other components of the animal tissue extract. Thus, the effective limits for the amount of quaternary ammonium salt precipitating the heparin complex are established by this simple test and the amount to be used may be chosen anywhere between these limits. The curve obtained by plotting the amount of precipitate versus the amount of quaternary ammonium salt added is shown in the appended drawing.

With reference to this drawing, the above limits are shown as points 11 and 12, the connecting line stylistically showing the amount of precipitate 13 obtained by adding additional amounts of quaternary ammonium salt 14.

This diagram clearly demonstrates the difference in solubility of the complexes of various components of the animal extract. It also shows that, when the amount of ammonium salt used to precipitate heparin is only slightly above the insolubility point 11, not all the heparin in the extract is precipitated. Approaching point 12 in the curve, heparin is precipitated quantitatively, and best results are obtained by operating with an amount just short of 12'. The slope of the curve beyond 12 is stylistically exaggerated and will experimentally be found to be less steep.

As mentioned before, the diagram changes somewhat depending on the animal extract that is used and also depending on the quaternary ammonium salt chosen. Depending on the solubility characteristics of the heparin complex in the particular medium, the curve may be displaced in respect to the axes, although the shape of the curve remains substantially the same, regardless of ammonium salt and tissue extract used. For those skilled in the art, it will be obvious that a once established curve for a given animal extract with a given ammonium salt will remain almost identical when a similar ammonium salt, differing, say, by a methylene or ethylene group, is used on the same animal extract. This is obvious from the solubility characteristics of the formed complexes: complexes differing only to such a minor extent have very similar solubilities in the identical media. Generally, it can be said that the amount of quaternary ammonium salt necessary for the precipitation of high potency heparin in good yield ranges from about 5–50 millimoles per 100,000 heparin units. This amount is far in excess of the stoichiometric amount, even if one mole of a quaternary ammonium salt is counted for each sulfonic acid group and for each carboxylic acid group in the heparin molecule.

The simplified process of the present invention thus consists in adding to the heparin-containing aqueous animal tissue extract a sufficient amount of a quaternary ammonium salt to precipitate substantially all the heparin but insufficient to precipitate other animal components present, isolating the water-insoluble heparin complex, redissolving the isolated complex is a salt solution, and precipitating the free heparin with a water-miscible, organic solvent, such as acetone, dioxane, alkanols, and the like. Heparin isolated in this manner is of high yield and excellent potency. This high potency is the main characteristic of the present process. When crude heparin is precipitated from animal tissue extracts according to prior methods, it is obtained at a potency of between 10 and 80 units/mg., mostly considerably below 50 units/mg., and then has to be worked up by complicated purifications to a potency of above 120 units/mg. The potency of the material obtained by the process of the present invention is normally above 100 units/mg. and mostly above 120 units/mg., thus eliminating various purification steps unavoidable when methods are used that produce heparin of lower potency.

The main advantage of the process of the present invention is its selectivity in precipitating the heparin and the heparin only. By adding the calculated or predetermined amount of the quaternary ammonium salts, all the heparin is precipitated while the other, less anionic materials, are left in solution. Heparin is more firmly bound in a quaternary ammonium complex than in the protein/heparin complex of animal tissue. Hence, the quaternary salt displaces protein from the anionic sites of heparin. The high basicity of quaternary ammonium complexes makes them more effective than other cationic compounds in removing heparin from the protein complex. Furthermore, since the quaternary ammonium/heparin complex is a strong acid/strong base type complex, the complexing occurs effectively over a very wide pH range. In addition, the selectivity of the complexing agent of the quaternary ammonium salt is irrespective of the tissue and species source and works effectively with any tissue extract containing heparin in aqueous solution.

In one embodiment of the present invention, the extract containing heparin is prepared by dispersing in water those animal tissues known to contain a relatively high percentage of heparin. To this slurry is added sodium sulfate and sufficient sodium hydroxide to bring the pH to 11.5. The mixture is then heated for 1½ hours to 50° C. and aluminum sulfate is added. The mixture is then adjusted to a pH of 7-8, heated to above 90° C., and filtered, preferably with the aid of a filter-aid. The filtrate contains substantially all the heparin originally present in the animal source. Of course, if it is desired, autolysis and/or digestion steps may still be carried out prior to the selective precipitation of the heparin, but these steps offer no particular advantage.

The following examples are given to illustrate the invention, but it should be understood that they are not intended to limit the invention in any way. In these examples the expression u./lb. means "units of heparin per pound of wet starting tissue," unless otherwise specified.

EXAMPLE 1

To 3,200 lbs. aqueous slurry of hog intestinal mucosa (10% solids) is added 150 gallons of water, 400 lbs. of sodium sulfate, and sufficient 50% caustic to give the mixture a pH of 11.5. The mixture is heated for 1.5 hours at 50° C. after which 100 lbs. of aluminum sulfate is added. Sulfuric acid is added to adjust the mixture to a pH of 7.5, followed by the addition of 150 lbs. filter-aid. The resulting mixture is heated by steam injection to 95° C., and filtered. The filter-cake is washed with hot water. The combined filtrate and wash comprises about 500 gallons containing 18.9 units/cc. (11,200 u./lb.) of heparin activity.

This solution is treated with 7.7 pounds of a 50% isopropyl alcohol solution of Arquad 16 (marketed by Armour & Co.) in which the active components are 90% hexadecyl trimethyl ammonium chloride, 6% octadecyl trimethyl ammonium chloride, and 4% octadecenyl trimethyl ammonium chloride, followed by the addition of 8 lbs. of filter-aid. The resulting mixture is stirred for about 1 hour, filtered, and the solids obtained are well washed with water of about 60° C. The solids are twice extracted with 8 gallon portions of 2 N sodium chloride solution at 60° C. which have previously been adjusted to pH 4 with acetic acid. The crude heparin is precipitated from the salt solution by the addition of 0.8 volume percent 3A alcohol. The isolated heparin is recovered in a yield of 9,500 u./lb., assaying 160 u./mg., a specific activity far exceeding any previously obtained crude heparin.

By replacing the above 50% solution of quaternary ammonium salts in isopropyl alcohol with a 25% aqueous solution containing the same quantities of active ingredients, the same result is obtained.

EXAMPLE 2

An aqueous slurry of 850 lbs. of hog intestinal mucosa (10% solids) is processed as in Example 1 to produce a combined filtrate and wash comprising 170 gallons of extract solution assaying 17.9 u./cc. of heparin (13,600 u./lb.).

To this extract is added 5 gallons of methyl isobutyl ketone and the solution is allowed to stand overnight. The resulting clear subnatant is treated with 640 cc. of a 50% isopropyl alcohol solution in which the active components are 90% hexadecyl trimethyl ammonium chloride, 6% octadecyl trimethyl ammonium chloride and 4% octadecenyl trimethyl ammonium chloride, followed by the addition of 2.5 gallons of methyl isobutyl ketone. A heparin complex which then floats to the surface is removed by drawing off the subnatant. The complex is washed with water, dissolved in 15 liters of 2 N sodium chloride at 60° C., filtered and precipitated with 0.7 volume percent of 3A alcohol. The isolated heparin is recovered in a yield of 11,000 u./lb. assaying 150 u./mg.

EXAMPLE 3

In this example, portions of an extract obtained in the manner described in Example 1 are treated with varying amounts of various quaternary ammonium salts and mixtures thereof and then processed as in the previous examples. The original heparin content of the extract is assayed and compared with the yields of crude heparin obtained after complexing, redissolving, and reprecipitating it in the manner described in Example 1. The yields are expressed in percent, based on the original heparin content of the extract, and in a separate column, the potency of the crude heparin is given in u./mg.

The salts exemplified in Table II are all commercial products containing at least 90% of the compounds listed. The remaining 0-10% are similar compounds, differing from those listed by a methylene group, a double bond, or a minor isomerism.

The molecular weights given in Table II are those of the cations only. The anions are not accounted for, since they do not participate in the complexing reaction. Other anions replacing the above chlorines would produce the identical results as long as the salts follow the solubility requirements. Of course, in the second column, the "moles/$10^8$ units" are based on the molecular weights of the salts. The results shown below demonstrate that, by increasing the amount of complexing agent to precipitate the heparin, higher yields are obtained, and that where the complexing agent has been added in an excessive amount, the potency of the crude heparin decreases. The potency of crude heparin should, of course, be as high as possible, although it will increase in subsequent purification steps. By determination of the effective limits for the quaternary ammonium salt addition in the manner described above, the present process will always produce crude heparin with a potency above 90 units per milligram, the practical minimum potency to make the present process economically attractive. The potency is determined according to a standard procedure described in the U.S. pharmacopoeia. The minimum potency for pharmaceutical preparations requires 120 units per milligram of heparin.

TABLE II

*Heparin Yield and Potency With Selected Quaternary Ammonium Salts*

| Ammonium salt (mol. wt.) | Amount added in moles/10³ units | Potency USP units | Yield in percent |
|---|---|---|---|
| $C_{16}H_{33}N(CH_3)_3Cl$ (284) | 5.7 | 133 | 17.1 |
| $C_{16}H_{33}N(CH_3)_3Cl$ (284) | 11.4 | 118 | 79.4 |
| $C_{16}H_{33}N(CH_3)_3Cl$ (284) | 22.8 | 104 | 91.2 |
| $C_{16}H_{33}N(CH_3)_3Cl$ (284) | 45.6 | 84.4 | 87.5 |
| $C_{12}H_{25}N(CH_3)_3Cl$ (228) | 12 | 129 | 60 |
| $C_{12}H_{25}N(CH_3)_3Cl$ (228) | 18 | 118 | 84 |
| $C_{12}H_{25}N(CH_3)_3Cl$ (228) | 24 | 97.1 | 84 |
| $C_{18}H_{37}N(CH_3)_3Cl$ (312) | 12.4 | 138 | 94 |
| $C_{18}H_{37}N(CH_2CH_2OH)_2(CH_3)Cl$ (372) | 12.4 | 142 | 98 |
| 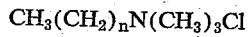 (406) | 6.3 | 142 | 57 |
| | 12.6 | 104 | 71 |
| | 21 | 95 | 75 |
| | 31.4 | 28 | 66 |
|  (304 to 360), R=$C_{12}H_{25}$ to $C_{16}H_{33}$ | 12.5 | 127 | 47 |
| 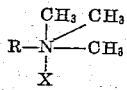 (304) | 8.8 | 92 | 82 |

From the above table it will also be seen that in order to obtain a heparin precipitate of a potency above 90 u./mg. with hexadecyl trimethyl ammonium chloride, less than 37.5 moles of the salt per 10⁸ heparin units is used. This value is easily determined by plotting the yields shown above versus the amounts of salt used. The thus established curve drops below the 90 u./mg. potency at 37.5 moles/10⁸ heparin units. The most economical range of operation for this ammonium salt is therefore between about 12 and 37.5 moles of the salt per 10⁸ units of heparin, the lower limit being dictated by the yield. Using octadecyl trimethyl ammonium chloride in place of the above quaternary ammonium salt, this curve drops below the 90 u./mg. potency level at a lower complexing salt amount, due to the lesser solubility of the formed complex in the aqueous medium. The best operative range thus is from about 10 to 35 moles of salt per 10⁸ heparin units. Shorter chain alkyl ammonium salts require somewhat greater amounts, since their heparin complexes are more soluble. These upper limits change only by small amounts where the quaternary ammonium salts differ only by an ethylene group or a double bond. However, where a heterocyclic quaternary ammonium salt is used, the solubility of the complex changes considerably and different limits will be observed.

As pointed out above, the source of the heparin extract is immaterial since the extract is assayed for heparin content before the selective precipitation of the heparin complex with the quaternary ammonium salts. Among the animal tissues that may be used for the preparation of the heparin extract are beef small intestines, beef lung, hog duodenum, hog liver, hog intestinal mucosa, dog liver, etc.

This application is a continuation-in-part of our copending application S.N. 764,502, filed October 1, 1958, now abandoned.

Others may practice the invention in any of the numerous ways which will be suggested to one skilled in the art by the present disclosure. All such practice of the invention is considered to be a part hereof provided it falls within the scope of the appended claims.

We claim:

1. In the process of isolating a water-insoluble heparin complex from an aqueous animal extract containing heparin, the step comprising: adding a quaternary ammonium salt which dissolves in water to at least 2% and in which one of the valencies of the nitrogen atom carries an essentially aliphatic hydrocarbon chain of at least 8 carbon atoms, said compound being added in an amount of from 10 to 30 moles per 10⁸ heparin units.

2. The process of claim 1 wherein the water-soluble ammonium salt is added as a solution in an organic solvent.

3. The process of claim 1 wherein said quaternary ammonium compound soluble to at least 2% in water is represented by the formula $RN(CH_3)_3Cl$, wherein R is an aliphatic hydrocarbon chain of at least 8 carbon atoms.

4. The process of claim 1, wherein the quaternary ammonium salt is a mixture consisting of at least 50% of $$CH_3(CH_2)_nN(CH_3)_3Cl$$

wherein $n$ represents an integer of at least 7, the remainder being represented by the formula:

$$CH_3(CH_2)_aE(CH_2)_bN(CH_3)_3Cl$$

wherein $a$ and $b$ are integers and the sum of $a$ and $b$ is at least 5, and wherein E is selected from the group consisting of the divalent radicals —CH=CH— and —CH₂—CH₂—.

5. The process of claim 1 wherein the quaternary ammonium salt is a mixture of quaternary ammonium salts represented by the formula $$\begin{array}{c} CH_3\ CH_3 \\ | \\ R-N-CH_3 \\ | \\ X \end{array}$$

wherein R is essentially a hydrocarbon chain containing at least 8 carbon atoms and wherein X is an anion which renders the ammonium salt a solubility of at least 2% in water.

6. The process of claim 1, wherein the nitrogen atom of said quarternary ammonium salt is a heteroatom of a heterocyclic ring system.

7. In the process of isolating heparin, the steps comprising: treating an aqueous slurry of animal tissue containing heparin with sodium sulfate at a pH of 11.5; heating said mixture to 50° C.; adding aluminum sulfate; adjusting the pH to 7–8; filtering said mixture at above 90° C.; treating the filtrate with a water-soluble quaternary ammonium salt soluble to at least 2% in water and carrying a hydrocarbon radical of at least 8 carbon atoms on the nitrogen, said ammonium salt being used in an amount of from 10 to 30 moles per $10^8$ heparin units forming an insoluble complex with said quaternary ammonium salt; isolating the formed water-insoluble heparin complex; dissolving said complex in a salt solution; and recovering the heparin therefrom.

8. The process of claim 7, wherein the water-insoluble heparin complex is isolated by filtration.

9. The process of claim 7, wherein the water-insoluble heparin complex is isolated by flotation.

10. The process of claim 7, wherein said quaternary ammonium salt is a compond of the formula:

$$R\!-\!N(CH_3)_3Cl$$

in which formula R represents an aliphatic hydrocarbon radical of at least 8 carbon atoms.

References Cited in the file of this patent
UNITED STATES PATENTS 2,989,438    Nomine ---------------- June 20, 1961

OTHER REFERENCES

Scott: Biochimica and Biophysica Acta, vol. 18 (1955), pages 428–429.

Scott: Chemistry and Industry, February 12, 1955, pages 168–169.